United States Patent [19]

Staar

[11] Patent Number: 4,611,894
[45] Date of Patent: Sep. 16, 1986

[54] DEVICE FOR DIRECT CINEMATOGRAPHIC VIEWING OF STEREOSCOPIC IMAGES ON FILM WITH A SOUND TRACK

[75] Inventor: Marcel Staar, Brussels, Belgium

[73] Assignee: Staar Development Co. S.A., Brussels, Belgium

[21] Appl. No.: 698,890

[22] Filed: Feb. 6, 1985

[30] Foreign Application Priority Data

Feb. 6, 1984 [BE] Belgium ............................ 212.339

[51] Int. Cl.[4] ............................................. G03B 41/04
[52] U.S. Cl. .................................... 352/114; 352/116; 352/119
[58] Field of Search ............... 352/113, 114, 115, 117, 352/118, 129, 239

[56] References Cited

U.S. PATENT DOCUMENTS

| | | | |
|---|---|---|---|
| 1,642,918 | 9/1927 | Bouin | 352/239 |
| 1,957,457 | 5/1934 | Holman | 352/117 |
| 2,325,131 | 7/1943 | Harrison | 352/129 |
| 2,945,418 | 7/1960 | Hudeley | 352/129 |
| 3,039,358 | 6/1962 | Vierling | 352/129 |
| 3,437,406 | 4/1969 | Rowell | 352/239 |
| 3,447,866 | 6/1969 | Heisler | 352/129 |

FOREIGN PATENT DOCUMENTS

| | | | |
|---|---|---|---|
| 197810 | 10/1978 | France | 352/129 |
| 421120 | 12/1934 | United Kingdom . | |

OTHER PUBLICATIONS

"Der Kinematograph under das sich bewegende bild", Dr. Carl Forch, pp. 99–100, A. Hartleben's Verlag, 1913.

Primary Examiner—Monroe H. Hayes
Attorney, Agent, or Firm—Leydig, Voit & Mayer, Ltd.

[57] ABSTRACT

Mobile refractive optical members are placed in a device between the film and stereoscopic direct viewing windows. A drive is provided for driving the film strip bearing stereoscopic images and the mobile refractive optical members at a uniformly constant speed and in synchronism across the fields of view of the viewing windows to provide a fixed image in each window despite the motion of the film; the film strip has a sound track which may be reproduced by conventional reproduction equipment since the film strip is driven at a constant speed.

3 Claims, 13 Drawing Figures

VIR

DEVICE FOR DIRECT CINEMATOGRAPHIC VIEWING OF STEREOSCOPIC IMAGES ON FILM WITH A SOUND TRACK

TECHNICAL FIELD

This invention relates to stereoscopic devices for direct cinematographic viewing and, particularly, stereoscopic cinematographic viewing devices equipped for reproducing sound recording from sound tracks.

BACKGROUND ART

The principal object of the invention is to provide devices for direct cinematographic viewing of stereoscopic images on film strips which also carry a sound track.

An important object of the invention is to provide such devices which produce very low mechanical noise so as not to disturb the user nor change the quality of the sound that is produced from the sound tracks.

A further object is to provide such devices particularly adapted for stereoscopic viewing and stereophonic sound reproduction which are precise, reliable, compact and economical to manufacture.

A related object of this invention is to provide a stereoscopic sound-equipped cinematographic system which produces very low mechanical noise and is compact and economical to manufacture.

DISCLOSURE OF INVENTION

In achieving these objects, mobile refractive optical means are placed in the device of this invention between the film and stereoscopic direct viewing windows. Means are provided for driving the film strip bearing stereoscopic images and the mobile refractive optical means at a uniformly constant speed and in synchronism across the fields of view of the viewing windows to provide a fixed image in each window despite the motion of the film; the film strip has a sound track which may be reproduced by conventional reproduction equipment since the film strip is driven at a constant speed.

BRIEF DESCRIPTION OF THE DRAWINGS

Further objects and advantages of the invention will become evident from the following description taken in conjunction with the accompanying drawings, in which.

BEST MODE FOR CARRYING OUT THE INVENTION

Figure 1:
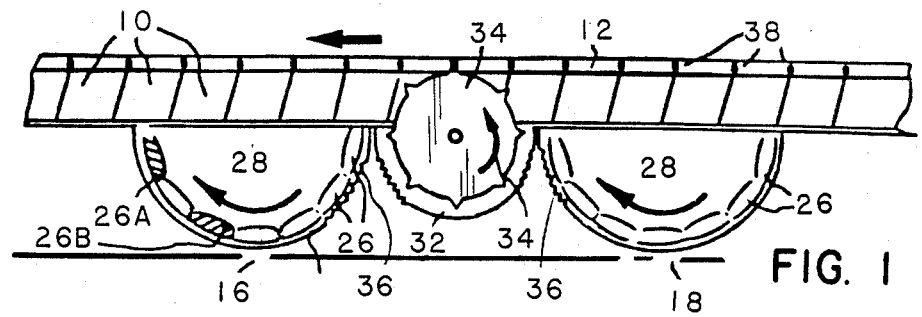
FIG. 1 shows a plan view of a film strip bearing cinematographic images.
Figure 2:
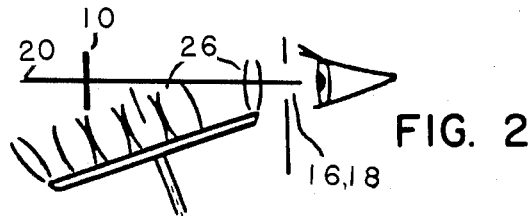
FIG. 2 is a schematic side view illustrating the relationship between the viewing windows, film strip and mobile optical means.

Referring to FIG. 1, a device according to this invention is shown for direct cinematographic viewing of stereoscopic images 10 on a strip of film 12, the film strip being schematically shown in FIG. 1. The film strip 12 is actually located as shown in FIG. 2. When the device is held in front of a user for viewing, the front surface of a housing 14 of the device where viewing windows 16, 18 are formed is located in a vertical plane, and the film strip 12 is supported in a vertical plane with the images movable horizontally across the fields of view of the viewing windows. The viewing axis 20 of each viewing window is horizontal, as shown in FIG. 2.

Figure 9:
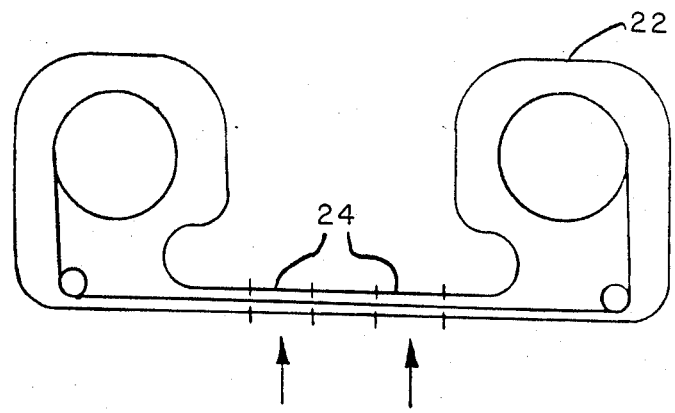
FIG. 9 is an illustration of a cassette for a film strip.

Preferably, the film strip 12 is located in a removable cassette 22 of the type shown in FIG. 9 with the film strip 12 contained within the cassette while being viewed and the cassette having windows 24 that align with the viewing windows 16, 18 in the housing 14 of the device to permit the images to be viewed as the film strip moves from reel to reel in the cassette 22.

In carrying out the invention, the cinematographic viewing device has a mobile refractive optical means through which the film strip images 10 are seen through the viewing windows 16, 18. It is preferred to employ a series of individual magnifying lenses 26 which are movable in succession across the fields of view of the windows. The magnifying lenses 26 are movable across the field of view of the windows 16, 18 in a path intermediately between the film strip 12 and the windows 16, 18. In order to mount the magnifying lens 26 for movement in this manner, the magnifying lenses are preferably arranged in a ring with each lens supported at its peripheral edge by a circular dish 28. As will be seen from FIG. 2, each lens 26 is positioned to stand obliquely relative to the plane of the supporting dish 28. With this oblique mounting arrangement, the dish 28 is mounted for rotation about an axis 30 which is inclined to the vertical so that the dish turns on an inclined plane and the lenses 26 may be successively rotated across the field of view of a window. As each lens 26 moves across the respective field of view and through the viewing axis 20, the other lenses on the dish 28 are out of the field of view so as to avoid interference with clear viewing of the film images.

To provide the ring of lenses 26 and dish 28, they may be fabricated separately and mounted in the position shown. Alternatively, preferably, they are injection molded of clear, optical grade plastic material supported by an integral ring or integral with the supporting dish 28. The physical and optical characteristics of the plastic or other material, i.e., glass, of which the lenses and dish may be formed, are chosen to match the dimensions and positions of the images on the film and the positions within the housing 16 to produce an image visible in the viewing windows and magnified to a desired extent. Furthermore, the lenses 26 provide movable refractive optical means for producing a fixed virtual image visible from each window as each film strip enters and moves across viewing axis. The lens moving in relation to the passage of the film continuously modifies the entry and exit angles of the light rays emerging from the image, producing a fixed virtual image on the viewing axis despite the continuous motion of the film's images. For illuminating the images, either natural or an artificial light source projecting through the images may be used.

In carrying out the invention, means are provided for driving the film strip 12 and lenses 26 at a constant speed in synchronism, herein shown as a toothed gear 32, provided on a common shaft with a sprocket wheel 34, the toothed gear 32 engaging teeth 36 on the edges of the dishes 28 supporting the lenses 26. With this arrangement, counterclockwise rotation of the sprocket wheel 34 which engages in holes 38 to move the film strip 12 in the direction of the arrow in FIG. 1 causes rotation in the clockwise direction of the two dishes 28.

Figure 3:
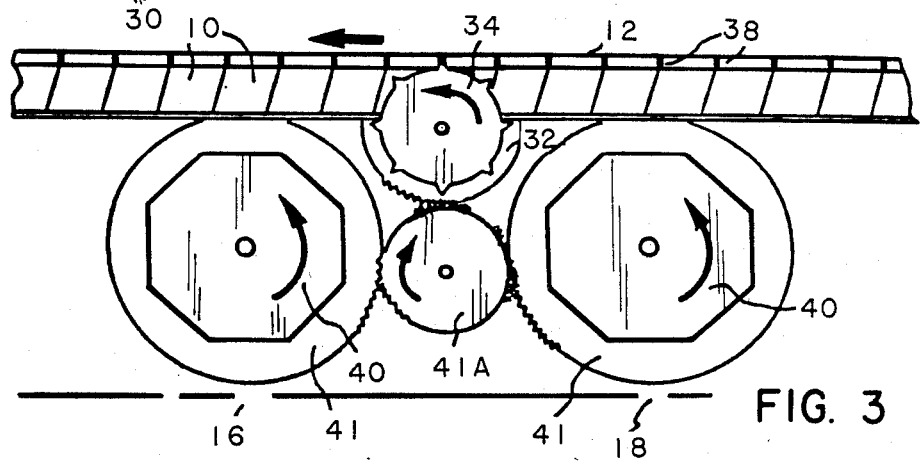
FIG. 3 is a view similar to FIG. 1 illustrating prisms for the mobile optical means instead of magnifying lenses as utilized in FIG. 1.
Figure 4:
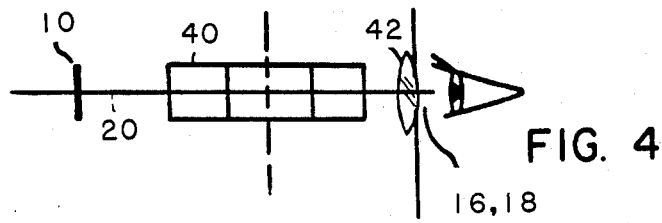
FIG. 4 is a schematic view similar to FIG. 2 illustrating the relationship between the viewing windows, film strip and prisms of the type shown in FIG. 3.

As an alternative means for producing a fixed image visible from the viewing windows 16, 18 as the film strip images 10 enter and move across the respective fields of view of the windows 16, 18, prisms 40 may be utilized as the mobile refractive optical means, as illustrated in FIGS. 3 and 4. The prisms 40 are placed intermediately between the film strip 12 and the viewing windows 16, 18.

Figure 7C:
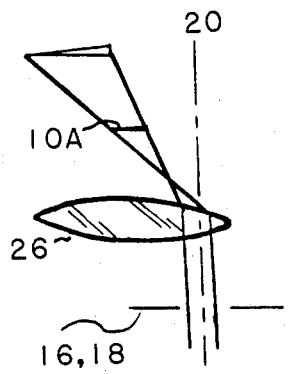
FIGS. 7A–7C are stop motion views illustrating the passage of a magnifying lens through the field of view of a viewing window in synchronism with an image on the film strip.
Figures 7A, 7B:
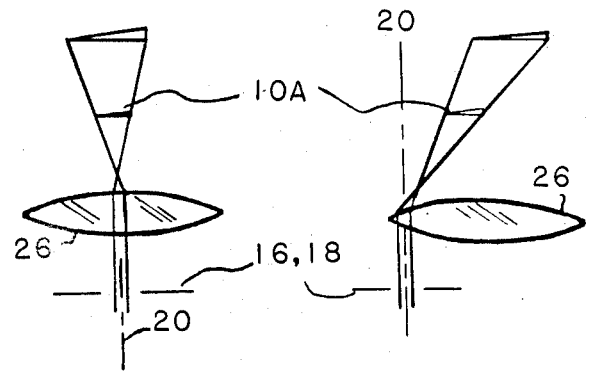

Referring to FIGS. 7A, 7B and 7C, it will be seen that these views illustrate in stop motion form the synchronous movement of a film strip 12 across the field of view of viewing window 16, and the three views illustrate the successive positions of the film strip 12 and the lens 26 moving in synchronism as the images on the film strip enter and move completely past the field of view of the viewing window.

Figures 8A, 8B, 8C:
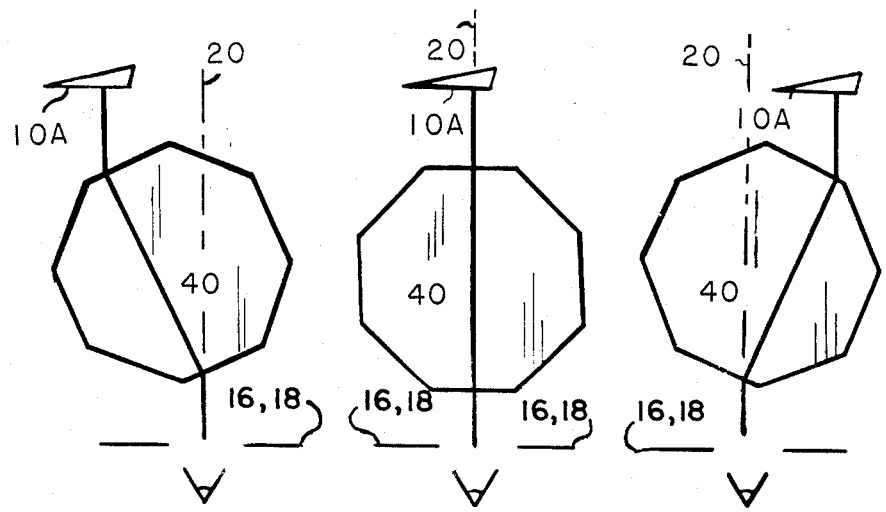
FIGS. 8A–8C are views like FIGS. 7A–7C for a prism.

Convergent lenses, as illustrated in FIG. 2, can be considered as a large number of prisms placed closely up against one another so that their surfaces merge into a continuous spherical surface. Therefore, passing such lens 26 through the viewing field of a window, as shown in FIGS. 7A–7C, provides an equivalent effect, in forming a fixed image in the field of view of the window, to rotating a prism, as illustrated in FIGS. 8A–8C so that its parallel surfaces are turned through the viewing field. Accordingly, when the term mobile refractive optical means is used herein, it encompasses both the magnifying lenses 26, as illustrated in FIGS. 1 and 2, and the prisms 40, as illustrated in FIGS. 3 and 4, and equivalent refractive optical devices.

Thus, in FIG. 7A, the image 10A of a particular frame on the film strip 12 is entering the field of view of the window 16. The edge of the lens 26 refracts the entry and exit angles of the light rays emerging from the film image to provide parallel rays passing through the viewing aperture so that a fixed virtual image is produced which appears to be on the axis of the viewing window 16. In FIG. 7B, the next section of the lens 26 is on the axis of the window 16. The image on the film strip which is still entering the field of view is refracted and a fixed image formed which is located on the axis of the viewing window 16. Similarly, as the film image leaves the field of view, as shown in FIG. 7C, the fixed virtual image is still formed on the axis of the window 16.

Referring to FIGS. 8A–8C, the relationship of the viewing images on the film strip 12 and the surfaces of the turning prism 40 is shown. As illustrated in FIG. 8A, the prism forms a fixed image on the axis of the window as the film image enters the field of view. Referring to FIG. 8B, in this condition, the light rays pass straight throught he prism 40 and are not deflected as they enter or leave the prism, and the image is on the axis of the viewing window. In FIG. 8C, the prism has turned from the positions of FIGS. 8A and 8B in the counterclockwise direction and, as the image 10A on the film strip 12 leaves the field of view of the viewing window 16, the image remains in the fixed position on the axis of the viewing window despite the continuous motion of the image on the film strip.

A fixed magnifying lens 42 (FIG. 4) may be placed on the axis 30 of the viewing windows 16, 18 to produce an enlarged image.

It is preferred that the film 12 be mounted in a removable cassette 22, shown in FIG. 9, for transfer of the film strip from reel to reel and across the field of view of the viewing windows 16, 18. Alternatively, a strip of film may be used.

Figure 5:
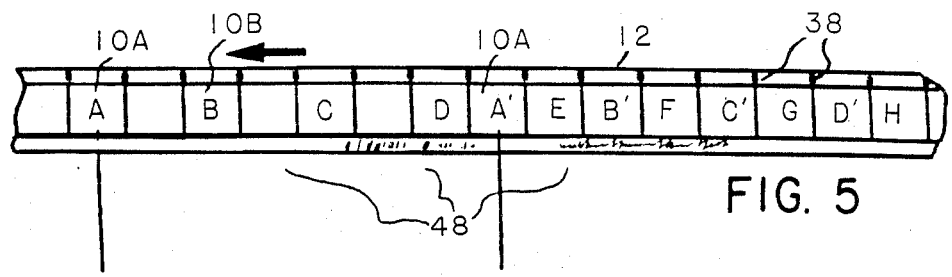
FIG. 5 is an illustration of a film strip with alternate frames having stereoscopic images for the same eye.
Figure 6:
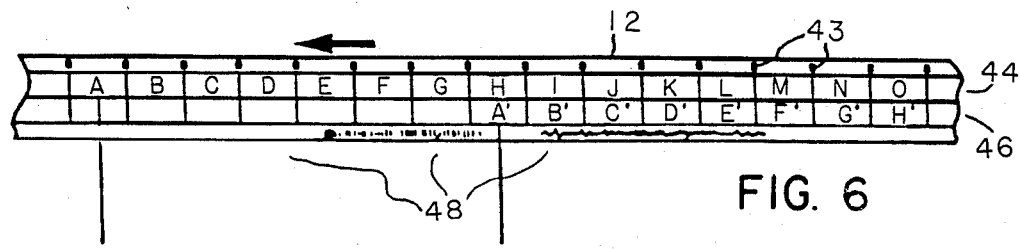
FIG. 6 is an illustration of a film strip with stereoscopic images for the same eye below or above the horizontal center line of the film.

Referring to FIGS. 5 and 6, alternative arrangements of the images on a film strip are illustrated. As shown in FIG. 5, alternate frames 10A, 10C are used for successive images to be viewed in each viewing window.

Turning now to FIG. 5, a simple arrangement of the images on a film strip is shown which overcomes the problem that occurs when the image on the film strip first viewed in the right hand viewing window 18 is moved by the film strip to a position in the field of view of the left hand viewing window 16. This problem is solved by alternating or staggering the images on the film strip, as shown in FIG. 5, and by arranging the lens 26 on the dishes 28 spaced by the distance of one lens so that every other lens position is active as each dish rotates. As indicated in FIG. 1, this may be achieved by masking the alternate lens 26 when they are arranged side by side. Alternatively, they may be spaced one lens apart and an even number mounted in a ring. Thus, the alternate lenses designated 26-A, 26-B are brought successively into active position in the viewing area of the left hand viewing window 16 to allow viewing of the alternate images 10-A, 10-B on the film strip (FIG. 5). When the left eye sees the image 10-A, the right eye can see the image 10-A' through the right hand viewing window 18. With such an arrangement, the images successively viewed in the left eye are: A-B-C-D-E-F, and the images viewed in the right hand viewing window are: A'-B'-C'-D'-, etcetera.

With respect to the examples shown in FIGS. 3 and 4, it is necessary to also make provision for covering certain pairs of parallel sides of the illustrated prisms in a manner emulating the staggered arrangement of lenses mentioned above. Thus, alternate pairs of the successive parallel sides of the prisms 40 are transparent for viewing as the prisms rotate in order and the other pairs masked to block out the alternate images on the film strip.

As an alternative arrangement, the images may be on the film strip 43 in parallel arrays 44, 46, one above the center line and one below the center line, as illustrated in FIG. 6. The field of view of the left viewing window 16, with this arrangement, will be adapted to allow viewing of the images on the top half 44 of the film strip 43, while the field of view of the right hand viewing window 18 will be adapted to allow viewing of the images on the bottom half 46 of the film strip 43. To utilize a film strip 43 as illustrated in FIG. 6, the two dishes 28 and magnifying lenses 26 of the arrangement of FIGS. 1 and 2 must be arranged at different elevations so as to bring the lenses 26 into alignment with the viewing axis which is at different elevations for the left and right viewing windows 16, 18. Similarly, the prisms 40 of the embodiment of the invention disclosed in FIG. 3 must be mounted at different elevations.

As a further alternative, a magnifying lens which is fixed in position adjacent the viewing window may be positioned slightly lower or higher so as to give each viewing window the series of images which are intended for it.

Further in carrying out the invention, sound recordings on one or several sound tracks 48 in monaural or stereophonic form are provided on the film strip 12 or 43 in the form of magnetic tracks, optical tracks or grooves. A conventional sound reproducing mechanism mounted in the housing 14 provides for reproducing the recordings, which relate to the images on the film strip.

Accordingly, the present invention provides a simple, compact drive mechanism capable of operating with a very low mechanical noise level to advance the film with uniform, continuous motion, allowing for direct reproduction of the recordings from the sound tracks 48 with acceptable sound quality while advancing the film strip for stereoscopic viewing.

I claim:

1. A device for cinematographic viewing of images on a strip of film comprising:
    a housing having a viewing window to allow viewing of the images on the film strip through a field of view;
    drive means in the housing adapted to receive and continuously move the film strip to pass the images on the film across the field of view of said viewing window; and
    mobile refractive optical means in said housing movable by said drive means between the film strip and the viewing window across the field of view in synchronism with the passage of the film strip images and forming an optical image which is visible through the window as the film strip images enter and move across the field of view and which is fixed despite the continuous motion of the images on the film strip, said mobile refractive optical means movable between the film strip and the viewing window comprising:
    magnifying lenses movable in succession across the field of view, the full passage of each magnifying lens corresponding to the full passage of an image on the film strip past the window,
    a dish-shaped element supporting said lenses at its periphery obliquely to the plane of said dish-shaped element, said lenses and dish-shaped element being formed integrally as an injection-molded plastic part, and
    means for rotatably supporting the dish-shaped element with the plane of the element inclined to a viewing axis intersecting one of said lenses and said window, each lens being movable across the field of view substantially transverse to said viewing axis as the dish-shaped element rotates.

2. A device according to claim 1, said dish-shaped element having integral molded gear teeth at its periphery providing a gear for cooperation with a drive gear of said drive means for rotating said element.

3. A device according to claim 2, said drive gear of said drive means having a substantially smaller diameter than the diameter of the dish-shaped element gear.

* * * * *